United States Patent [19]
Yamauchi

[11] 3,786,569
[45] Jan. 22, 1974

[54] THREE-POINT INSIDE TAPER-MEASURING INSTRUMENT

[75] Inventor: Minero Yamauchi, Kawasaki, Japan

[73] Assignee: Yehan Numata, Yokohama City, Japan

[22] Filed: Nov. 22, 1971

[21] Appl. No.: 200,756

[52] U.S. Cl. ............................................. 33/174 E
[51] Int. Cl. ............................................. G01b 5/24
[58] Field of Search ...................... 33/174 E, 174 R

[56] References Cited
FOREIGN PATENTS OR APPLICATIONS
1,548,217   8/1969   Germany .......................... 33/174 E Primary Examiner—John W. Huckert
Assistant Examiner—Jon W. Henry
Attorney, Agent, or Firm—Brisebois & Kruger

[57] ABSTRACT

This invention relates to an instrument for measuring the degree of an internal taper and comprises a cone having an inclined surface which increases in diameter from its inner to its outer end and is moved axially within a tubular sleeve by an actuating screw. Three identical longitudinal measuring members are pivotally attached to said tubular sleeve at their forward ends and supported resiliently at their rearward ends. Adjustable abutment members projecting inwardly of said measuring members contact the surface of said cone.

1 Claim, 4 Drawing Figures

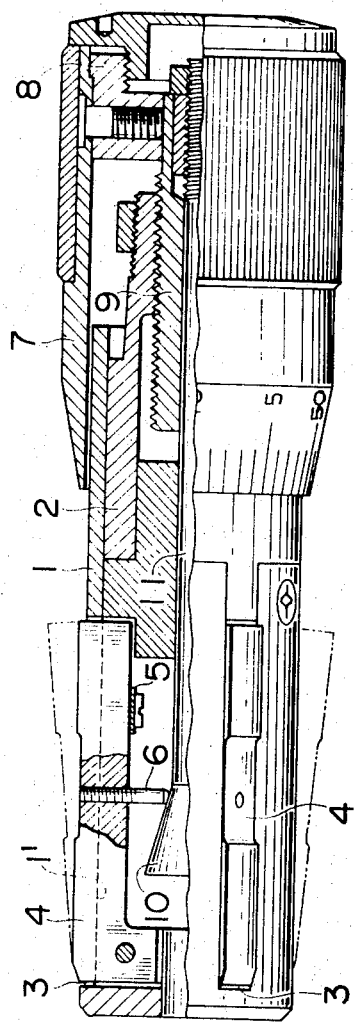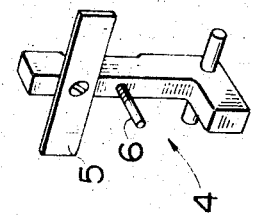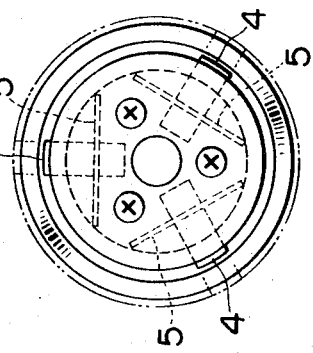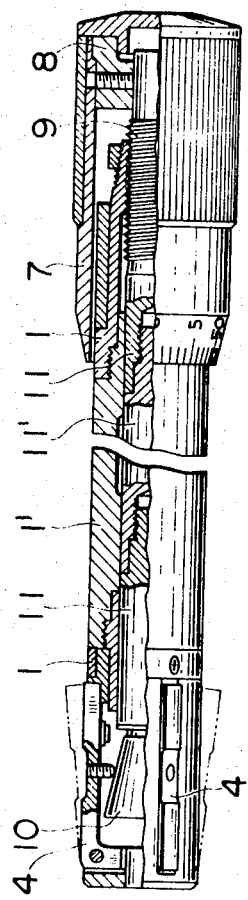

THREE-POINT INSIDE TAPER-MEASURING INSTRUMENT

SUMMARY OF THE INVENTION

A principal object of this invention is to provide an instrument for measuring the degree of an internal taper, and having a simple construction in which the front end of each of three longitudinal measuring members is pivotally attached to a tubular sleeve and the rear end thereof is resiliently urged into contact with the inclined surface of a cone within the sleeve.

Another object of this invention is to provide a measuring instrument for measuring the degree of an internal taper in which the resilient supporting means for the rear ends of each measuring member consists of a leaf spring attached to the central part of that measuring member, thus making it possible for the measuring member to swing substantially outward while permitting the pressure caused by measurements to change by only a small amount.

These and other objects of this invention will be more fully apparent from the description of two specific embodiments set forth hereinafter.

Conventionally the degree of an inside taper is calculated from two values obtained by the measurement of diameters at two different points. However, this method takes some time in order to carry out the necessary calculations. A measuring instrument according to this invention is so devised as to eliminate this kind of time loss.

Referring now to the accompanying drawings:

FIG. 1 is a side elevational view of an instrument according to the invention with the outer sleeve partially broken away;

FIG. 2 is an end view taken from the left of FIG. 1;

FIG. 3 is a perspective view of a single measuring member; and

FIG. 4 is a side elevational view showing another embodiment of this invention.

Referring to FIGS. 1 – 3, a tubular sleeve 1 has an internally threaded barrel 2 attached to its rearward end. Each of three slots 3 in the forward end of the sleeve extends longitudinally along said tubular sleeve. Each of these slots receives a measuring member 4 pivotally mounted so as to swing freely therein. Each measuring member 4 is L-shaped, as illustrated in FIG. 3, and pivotally attached to the tubular body 1 with its hooked end positioned inwardly and forwardly of the tubular sleeve 1. Each measuring member 4 has a leaf spring 5 attached to the inner surface of its rear end (the upper portion in FIG. 3) which is positioned traversely and symmetrically of the member 4. This leaf spring 5 is so mounted as to strike the inner wall 1' of the tubular sleeve at both edges of the slot therein so that the spring resiliently supports the rearward portion of the measuring member. The measuring member 4 also has an abutment member 6 between its pivot point and the leaf spring 5 which projects inwardly and is biassed against the inclined surface of the cone (described later) by the force of the leaf spring. The abutment member is screwed into the measuring member 4 so that its exposed length may be occasionally adjusted.

An externally threaded barrel 9 is attached to a thimble 7 by a ring 8. This externally threaded barrel 9 has a spindle 11 attached thereto which is provided with a cone 10 which increases in diameter from back to front. The threads of the externally threaded barrel 9 mesh with the threads of the internally threaded barrel 2.

In use, when the spindle 11 is actuated, for example, to slide rearward, by rotation of the thimble 7, the rear end of each measuring member is swung outwardly around its pivot point. On the contrary, when the spindle is driven forwardly, the rear end of each measuring member is then swung inwardly by the pressure of the leaf spring.

The angular position of the measuring members is readable on a graduated scale marked on the thimble which cooperated with an indicium on the sleeve. The angle of inclination of the cone's surface should be equal to the angle between the measuring member at its pivot point and the inner end of the abut member, if so arranged that the cone is axially parallel to the measuring member. However, it is not always necessary for the measuring member to be axially parallel to the cone.

FIG. 4 shows another example embodying this invention. The same reference numerals as in the first example are applied to the same or similar parts. This second embodiment shows an elongated instrument adapted to measure the degree of taper of a deep hole. In its construction, two separate spindles 11, 11 are connected by a coupling spindle 11' screwed thereto, so as to effectively elongate the spindle. Similarly, two separate tubular bodies 1, 1 are connected by a threaded coupling rod 1'.

As apparent from the above description, the measuring instrument according to this invention comprises a cone having an inclined surface which increases in diameter from front to back and is actuated for axial movement within the tubular sleeve by a suitable leadscrew; three measuring members pivotally attached to said tubular sleeve at their forward ends and resiliently supported at their rearward ends by a transverse leaf spring and abutment members projecting adjustably inward from said measuring element to contact the surface of said cone. Such construction makes it possible to obtain a measurement of the degree of a taper quickly and correctly by moving the cone forward and backward, with the measuring members responsive to light pressure.

What is claimed is:

1. A measuring instrument for measuring internal taper, said instrument comprising a tubular sleeve, a spindle having a forward end and an inner end mounted in said tubular sleeve, a conical portion of said spindle having an inclined surface which increases in diameter toward the forward end of said spindle, screw means for axially advancing and retracting said spindle within said sleeve; indicia on the outside of said instrument for indicating relative movement of said spindle and sleeve, a plurality of measuring members positioned radially of said conical portion and having their forward ends pivotally attached to said sleeve forwardly of said conical portion; a leaf spring for each measuring member resiliently urging its respective measuring member toward said conical portion, each spring being mounted on the inner surface of its respective measuring member so that both ends of said spring project transversely from said measuring member and engage the inner wall of said tubular sleeve; and abutment members, each being adjustable in length, and projecting radially inward from said measuring members to contact said inclined surface and thus limit the movement of said spindle in one direction relative to said sleeve in dependence on the position of said measuring members.

* * * * *

UNITED STATES PATENT OFFICE
CERTIFICATE OF CORRECTION

Patent No. 3,786,569             Dated 22 January 1974

Inventor(s) MINERO YAMAUCHI

It is certified that error appears in the above-identified patent and that said Letters Patent are hereby corrected as shown below:

[30]         Foreign Application Priority Data

December 9, 1970    Japan..........SHO 45-122107

Signed and sealed this 16th day of July 1974.

(SEAL)
Attest:

McCOY M. GIBSON, JR.                C. MARSHALL DANN
Attesting Officer                   Commissioner of Patents